US007831683B2

(12) United States Patent
Becker et al.

(10) Patent No.: US 7,831,683 B2
(45) Date of Patent: Nov. 9, 2010

(54) STORAGE AND ACCESS METHOD FOR AN IMAGE RETRIEVAL SYSTEM IN A CLIENT/SERVER ENVIRONMENT

(75) Inventors: Detlef Becker, Moehrendorf (DE); Karlheinz Dorn, Kalchreuth (DE); Artur Pusztai, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1137 days.

(21) Appl. No.: 10/975,464

(22) Filed: Oct. 29, 2004

(65) Prior Publication Data

US 2005/0108365 A1 May 19, 2005

(30) Foreign Application Priority Data

Oct. 31, 2003 (DE) ................. 103 51 317

(51) Int. Cl.
*G06F 15/16* (2006.01)
(52) U.S. Cl. .................. 709/217; 709/203; 709/219
(58) Field of Classification Search .................. 709/203, 709/217, 219; 707/1, 2, 3
See application file for complete search history.

(56) References Cited

U.S. PATENT DOCUMENTS

| 4,958,283 | A  | * | 9/1990  | Tawara et al. ............... 382/131 |
| 6,085,223 | A  | * | 7/2000  | Carino et al. ............... 709/203 |
| 6,356,921 | B1 | * | 3/2002  | Kumar et al. ............... 715/203 |
| 6,574,742 | B1 | * | 6/2003  | Jamroga et al. ............. 713/400 |
| 6,658,167 | B1 | * | 12/2003 | Lee et al. .................... 382/305 |
| 6,742,082 | B1 | * | 5/2004  | Lango et al. ................ 711/118 |
| 6,925,208 | B1 | * | 8/2005  | Huffman ..................... 382/232 |
| 7,181,617 | B2 | * | 2/2007  | Wise et al. .................. 713/164 |
| 7,437,430 | B2 | * | 10/2008 | Rhoads ....................... 709/219 |
| 2002/0023172 | A1 |   | 2/2002  | Gendron et al. |
| 2002/0077864 | A1 | * | 6/2002  | Cavallaro et al. .............. 705/3 |
| 2003/0005464 | A1 | * | 1/2003  | Gropper et al. ............. 725/115 |
| 2003/0103214 | A1 | * | 6/2003  | VanDelden .................. 356/491 |
| 2003/0202189 | A1 | * | 10/2003 | Tamiya et al. ............... 356/494 |

* cited by examiner

*Primary Examiner*—William C Vaughn, Jr.
*Assistant Examiner*—Mohamed Ibrahim
(74) *Attorney, Agent, or Firm*—Harness, Dickey & Pierce, P.L.C.

(57) ABSTRACT

An image retrieval system has a network server, at least one client terminal and a data archive of a multiuser file management system, spatially separated from server and client, of a file server. A reduced data stream is now transmitted between server and client and includes a header for transmitting address and meta information with an additional data field that includes an access key to the bulk data stored in the external data archive. This reduces the data volume to be transmitted during image retrieval, and thus reduces the network utilization in the transmission of the data stream occurring between server and client. As a result of this, the time period required to transfer the modified data stream between server and client terminal is correspondingly short.

18 Claims, 6 Drawing Sheets

Transmission sequence

STORAGE AND ACCESS METHOD FOR AN IMAGE RETRIEVAL SYSTEM IN A CLIENT/SERVER ENVIRONMENT

The present application hereby claims priority under 35 U.S.C. §119 on German patent application number DE 103 51 317.5 filed Oct. 31, 2003, the entire contents of which are hereby incorporated herein by reference.

FIELD OF THE INVENTION

The present invention generally relates to a storage and access method, suitable for an image retrieval system, in a data transmission network organized using the client/server principle.

BACKGROUND OF THE INVENTION

Network connections with a high bandwidth are presently required for the rapid transport of medical image data (for example MRT or CT data) in a networked environment. The trend in medical diagnosis is toward methods that, because of higher demands placed on image resolution, require real-time processing of ever larger data volumes, and higher data rates, and this is attended by an increase in network utilization when sending image data.

An optional access to a subset of the image data (for example the first and last frame of an image data sequence comprising a number of frames) is possible only locally, since the entire image (for example according to the DICOM standard) has been transmitted completely. By contrast, it would be desirable to have an optional access to the bulk data (for example to individual frames or a number of pixels of an image) in order, if required, to enable individual data blocks of the image data sequence to be transmitted in an optimized fashion with regard to the network utilization (by contrast with transmission of the complete image data sequence in accordance with the DICOM standard).

US 2003/0005464 A1 describes a client/server system and an associated method for separately storing medical image data (pixels) and meta data (header) in a computer network, the image data being stored in a central data archive without any kind of additional information, and the meta data, including specific generated links to the image data, being stored in a separate, spatially remote data archive. The separated storage is intended in this case to ensure recourse to standard technologies for data storage on a scalable scale, and to ensure compliance with data protection requirements.

US 2002/0023172 A1 discloses a client/server system and an associated routing method for transmitting medical image data and meta data via a packet-switched computer network. Use is made here of a router that evaluates the address information contained in the data packets to be sent, and uses routing tables to determine the most favorable path of the data from a central network server through the network to a client terminal. The system in this case includes the allocation of access keys, so-called "Global Unique Identifiers" (GUIDs), for medical image data. Such a GUID is intended to be used given the presence of a number of copies of an image data record to detect whether a copy is locally available or must be first be downloaded from the central network server. Image data and meta data are treated in this case in a different way.

Since an exemplary embodiment of the present invention refers to a storage and access method that is preferably intended to be used in the field of medical image retrieval, two of the currently predominantly used communication standards for the description, storage, transmission and interpretation of medical image data and of context information allied thereto, namely: DICOM SR ("Digital Imaging and Communication in Medicine—Structured Reporting") and HL7 ("Health Level Seven") are briefly presented below.

The communication standard DICOM, whose third part is described in detail in the specialist article "Digital Imaging and Communications in Medicine (DICOM)" (PS 3.3-2003, Rosslyn, Va.) is a standard for exchanging and managing medical image data and other data associated therewith. It was developed in the field of radiology and will in future also be promoted as a standard in all other specialist medical fields.

A DICOM document includes two sections: Header data including the "Report Title" consisting of DICOM code, and the so-called "Document Content Sequence", which includes the medical data part coded using the SNOMED ("Systemized Nomenclature for Medicine") standard. SNOMED is a descriptive language with its thesaurus comprising more than 50,000 terms, and is used for coding, indexing and finding data in patient files. Mnemonic, hierarchical, group-sequential, incremental and combination codes belong to the coding schemes used in this case. In addition to SNOMED, the DICOM standard uses numerous further coding schemes (for example ICD or LOINC).

The HL7 CDA standard described in detail in the specialist article "HL7 Clinical Document Architecture Framework" (Release 1.0, 2000) is an international communication standard for the exchange, management and integration of data that are required for patient treatment.

By contrast with unstructured full-text documents, HL7 CDA and DICOM SR documents are distinguished by an explicitly coded document structure that is characterized, for example, by coded chapter and section designations. The context information respectively associated with any data element for which entry is envisaged can be read out in this case from a library file. These items of context information are lost in conventional methods for indexing full-text documents, thus reducing the accuracy of the search process. Consequently, it is not possible to ensure in the case of conventional indexing that a search request will supply all relevant documents for a specific search request.

Structured objects that are stored in the DICOM SR or HL7 CDA format do not themselves contain image objects (including header data and binary-coded image data) but so-called unique identifiers (UIDs) via which image data and other objects (such as biosignal data, for example) are referenced. DICOM SR uses, for example, UIDs, which are used to denote the type and entity of referenced objects. Within the document, these UIDs are in the context of further described data, for example codes, with the aid of which an investigation method is described in more detail. The "content" of a specific referenced object can be described, together with relevant observations, with the aid of these meta data.

Extensions of the O2 query language are known for structured SGML documents and object-oriented databases, as explained in the article entitled "From Structured Documents to Novel Query Facilities", (SIGMOD RECORD, 23 (2): 313-324, June 1994) by V. Christophides, S. Abiteboul, S. Cluet and M. Scholl. XQuery language, which is described in "XQuery 1.0: An XML Query Language" (W3C Working Draft 2002) and is suitable for information retrieval applications, exists for XML documents; it makes use of XPath language described in the specification "XML Path Language (XPath) Version 1.0" (W3C Recommendation 1999) in order to address parts of an XML document. XPath is capable of selecting document nodes with specification of various criteria, and of carrying out fundamental manipulations on character chains, Boolean values and node sets, and contains a simple function library that can be expanded by means of user-defined functions.

Medical image data are usually sent with the aid of the DICOM protocol via local data transmission networks (for example via the LAN of a hospital) in the case of products that are currently commercially available. In this case, a complete image data sequence which includes, for example, demographic patient data, measurement parameters, image data and conventional examination information (notes, graphics etc.) is serialized, coded and sent via the network. The serialized data stream is decoded at the receiver end and correctly reconstituted so that a local application can then optionally access the data. This means that even frames not required by the receiver are sent along with the data stream.

SUMMARY OF THE INVENTION

An embodiment of the present invention includes an object of providing a storage and access method for image retrieval that permits the efficient access to image data (for example to individual frames) of a document management system. A further object of an embodiment of the invention resides in reducing the network utilization when transmitting the data stream occurring during image retrieval from a network server to a client terminal.

An embodiment of the present invention discloses a storage and access method, suitable for an image retrieval system, in a data transmission network organized using the client/server principle, and an associated image retrieval system comprising a network server, at least one client terminal, and a data archive of a multiuser file management system, spatially separated from server and client, of a file server.

According to an embodiment of the inventive method, a data stream standardized according to the DICOM protocol is modified in such a way that only meta data (for example address data and measurement information relating to the individual frames of an image data sequence) are sent via the data transmission network, but the same is not true of, for example, the pure bulk data (that is to say the individual frames of the image data sequence) present as a large binary file (Binary Large Object, BLOB). According to an embodiment of the invention, the mass data are stored in a data archive of the file management system spatially separated from transmitting and receiving system, and can be retrieved via access keys (links) to the files containing these bulk data. According to an embodiment of the invention, these access keys are embedded in the header of the DICOM data stream as additional meta information.

An advantage of the method according to an embodiment of the invention is that only a small portion of the data to be transmitted overall by the transmitting system (for example a network server) to the receiving system (for example a client terminal) is initially sent via the network. In this way, the data volume to be transmitted is reduced, and therefore the transmission time is correspondingly shortened. The access key can now be used for optional access to individual frames of the image data stored in the data archive of the external file management system without the need for all the frames of an image data sequence to be transmitted to the client terminal. This also reduces the data volume to be transmitted and therefore shortens the access times to the individual frames.

A further advantage may be the use of this method for optimized access to files of a multiuser file management system (Shared File System). Moreover, the method described here can also be applied to other BLOB attributes (for example of type OB/OW) that are included in the DICOM data stream. In addition to multiuser file management systems, other generally accessible exchange media are also suitable in principle for the method according to an embodiment of the invention.

BRIEF DESCRIPTION OF THE DRAWINGS

Further characteristics, features, advantages and applications of the basic invention follow from the following description of two exemplary embodiments of the invention, which are depicted in the following drawings, wherein.

DETAILED DESCRIPTION OF THE EXEMPLARY EMBODIMENTS

Figure 1:
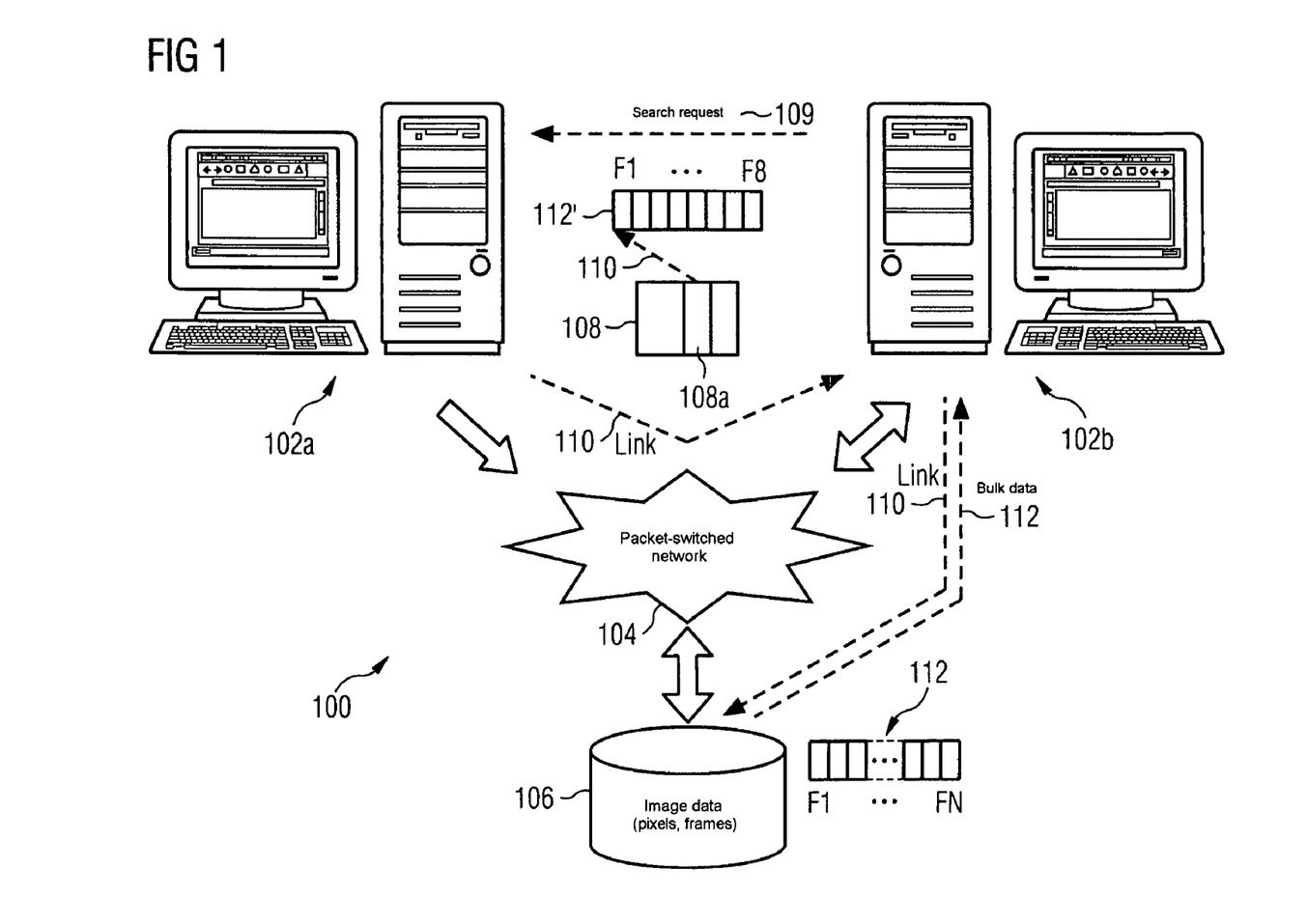
FIG. 1 shows a block diagram of a client/server architecture of an image retrieval system for a storage and access method in accordance with an embodiment of the present invention.

The steps of the method according to an embodiment of the invention (compare FIGS. 7a-c) and the functions of the system components, as depicted in FIG. 1, included in the exemplary embodiments of the fundamental invention are explained in more detail below.

FIG. 1 shows a block diagram of the client/server architecture of the image retrieval system 100 according to an embodiment of the invention, which includes a transmission unit 102a (for example a network server), a reception unit 102b (for example a client terminal) and a data archive 106a of a multiuser file management system 106, spatially separate from the transmission and reception unit, of a file server 106b. The fact that a modified DICOM data stream 108 including a header for transmitting address and meta information with an additional data field 108a for an access key 110 to the bulk data 112 stored in the external data archive 106a, is transmitted between the server 102a and client terminal 102b means that the data volume to be transmitted, and thus the network utilization, are decisively reduced when transmitting the data stream occurring during image retrieval between server 102a and client 102b. As a consequence of this, the time period $T_{\ddot{U}}$ required for transferring the modified DICOM data stream is correspondingly short. If the access key 110 is a pointer via which individual frames (for example F1 to F8), requested by the client terminal 102b, of the bulk data 112 stored in the data archive are specifically addressed, the time period $T_z$ that is required by the client terminal 102b after reception of the access key 110 by the server 102a for accessing this frame can likewise be decisively reduced.

Figure 2:
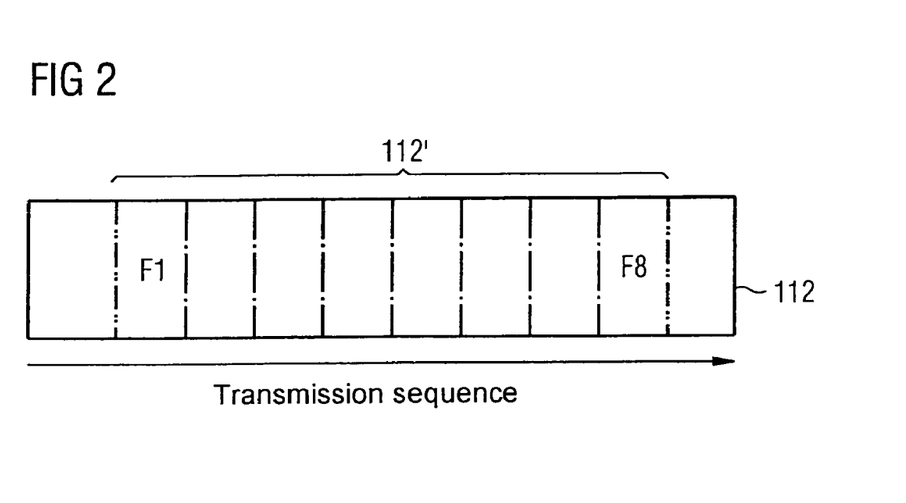
FIG. 2 shows the frame structure of a conventional DICOM data stream.

FIG. 2 is a sketch of the frame structure of a conventional DICOM data stream for transferring an image data sequence 112, to be transmitted from the network server 102a to the client 102b, via a packet-switched data transmission network 104; the image data sequence includes the serialized image data 112 of a document stored in the DICOM format. It includes a header for transmitting address and meta information, and a user data part that includes the said image data. The transmission sequence of the individual frames (F1 to FN) of this image data sequence 112 is likewise to be seen from FIG. 2. The frames F1 to F8 requested by the client terminal 102b are particularly emphasized here.

Figure 3:
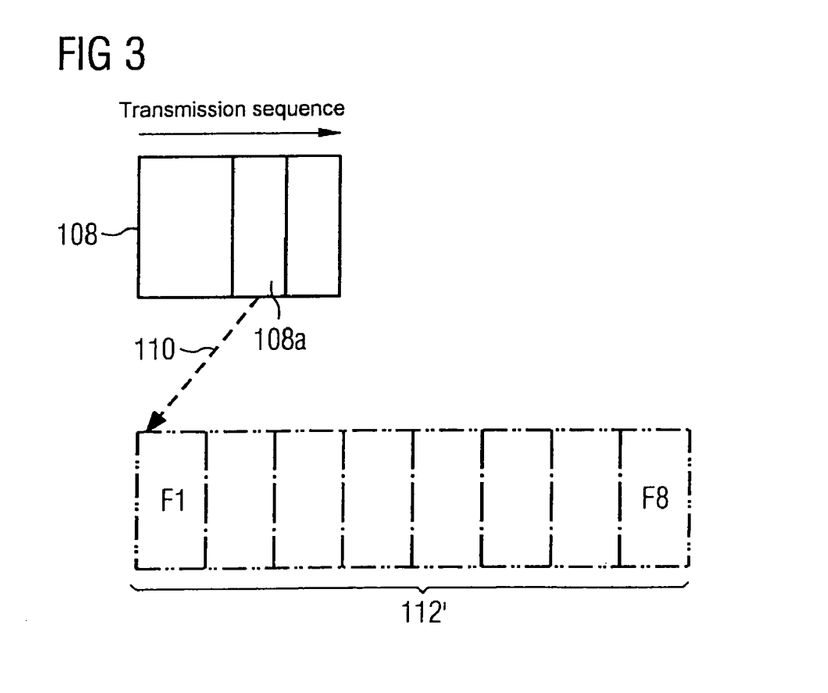
FIG. 3 shows a diagram illustrating the splitting of the image data sequence into a component that is not to be transmitted and includes the bulk data (that is to say the frames including individual pixels) stored in the multiuser file management system, as well as a component (modified DICOM data stream) that is to be transmitted and is expanded by a section that includes a link to the bulk data.

The splitting of the image data sequence 112 into a component that is not to be transmitted including the bulk data 112 (that is to say the frames F1 to FN comprising the individual pixels) stored in the data archive 106a of the external multiuser file management system 106, and into the component 108 to be transmitted (the "modified" DICOM data stream) is shown in FIG. 3. The modified DICOM data stream 108 to be transmitted is expanded here by a section that includes an access key 110 (a link) to the bulk data 112 or a section 112' thereof. This ensures that the bulk data 112 or requested fragments 112' of these bulk data need no longer be transmitted between server 102a and client 102b. By comparison with the transmission of the complete image data sequence 112, the network utilization is therefore lower.

The ratio of the data volume $L_\ddot{U}$ of the data 108 to be sent to the data volume L of the bulk data 112 is strongly dependent on the respective image type and can assume values of 1:1000 (3 kByte headers and 3 MByte pixels) or below. As emerges from FIGS. 1 and 3 to 6, the additional section 108a required for the link 110 is relatively small. It is to be noted, however, that this ratio is not reproduced in a manner true to scale in the above-named drawings.

Figure 4:
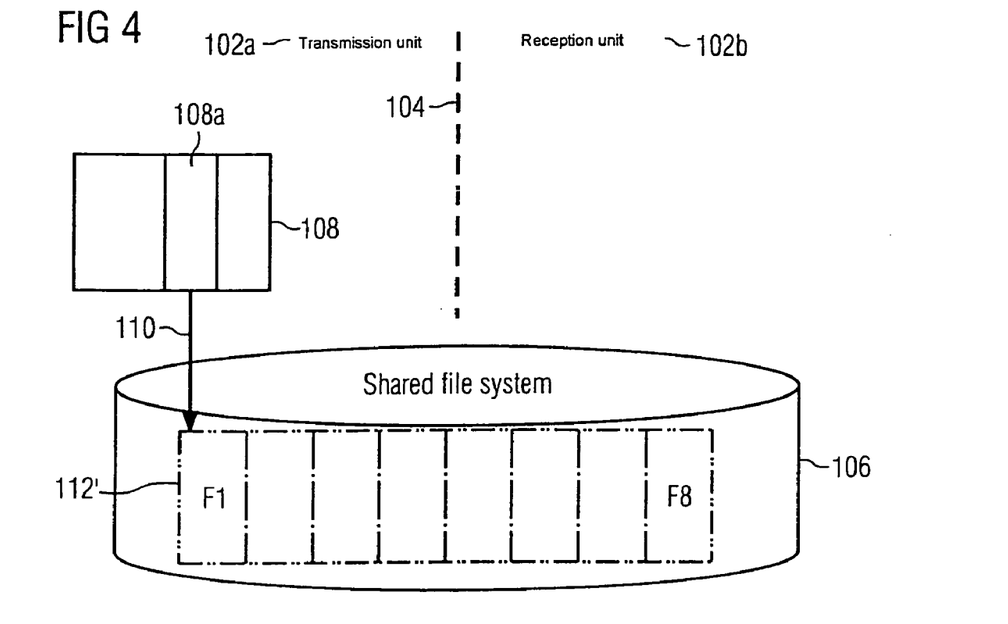
FIG. 4 shows a block diagram illustrating the generation of the modified DICOM data stream via the transmission unit.

As illustrated in FIG. 4, the modified DICOM data stream 108 is generated by the network server 102a. For this purpose, the network server 102a must know the storage address of the precisely specified frames (for example F1 to F8) previously requested by the client terminal 102b. According to a first exemplary embodiment of the present invention, the network server 102a can either extract the assignment of the storage addresses relating to the individual frames F1 to FN stored in the data archive 106a of the external file management system 106 directly from an assignment table of a local database or retrieve it from the file server 106b. In accordance with a further exemplary embodiment, this assignment takes place via the access key 110 that is included in the additional data field 108a in the header of the modified DICOM data stream 108 and that is, according to the invention, a pointer (DICOM Unique Identifier, DICOM UID) to a section 112' (for example to individual frames) of the image data 112 of a file stored in DICOM format and which contains the image data in plain form.

Figure 5:
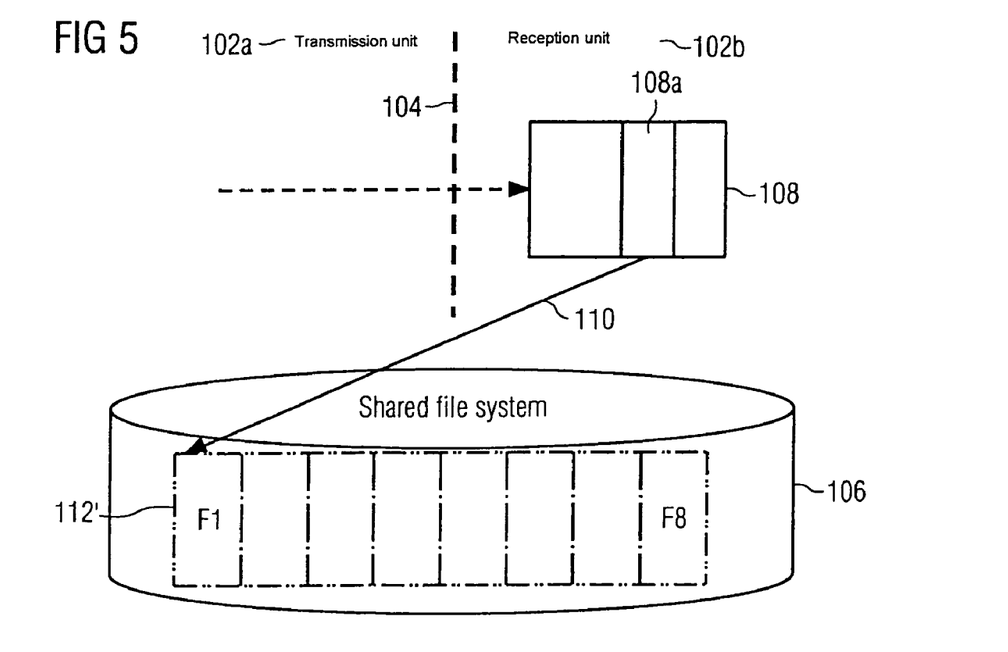
FIG. 5 shows a block diagram illustrating the sending of the modified DICOM data stream from the transmission unit to the reception unit.
Figure 6:
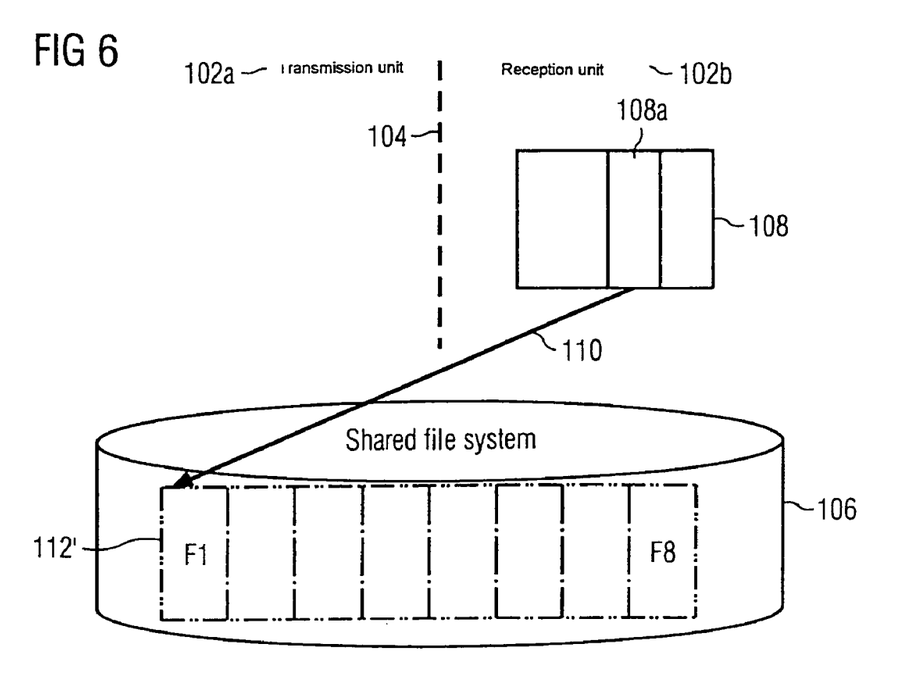
FIG. 6 shows a block diagram illustrating the optional access of the reception unit to the bulk data via the link after the reception of the modified DICOM data stream from the transmission unit.

FIG. 5 illustrates the operation of sending the modified DICOM data stream 108 including the access key 110 from the network server 102a to the client 102b via the data transmission network 104. After reception of said data stream 108, the client 102b can then, as illustrated pictorially in FIG. 6, optionally access the section 112', which can be accessed via the access key 110, of the image data sequence 112 (for example the frames F1 to F8).

Figure 7A:
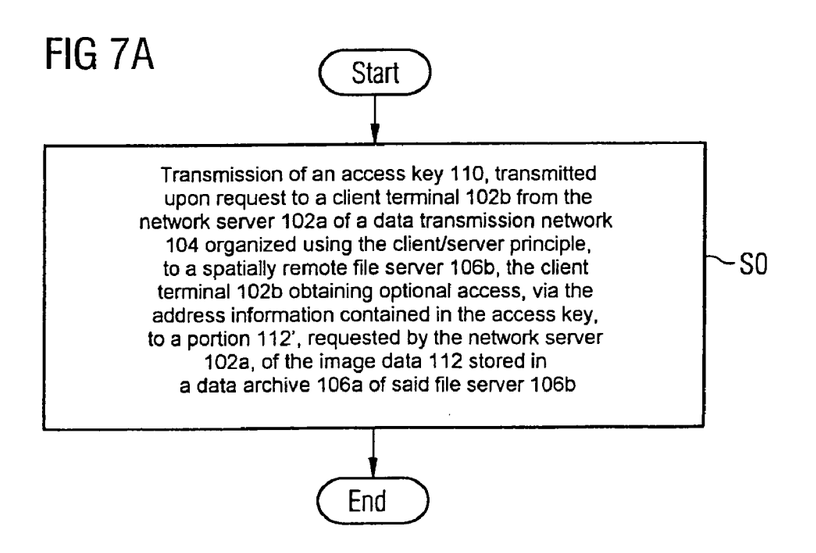
FIGS. 7a-c show three flowcharts illustrating the storage and access method according to an embodiment of the invention.
Figure 7B:
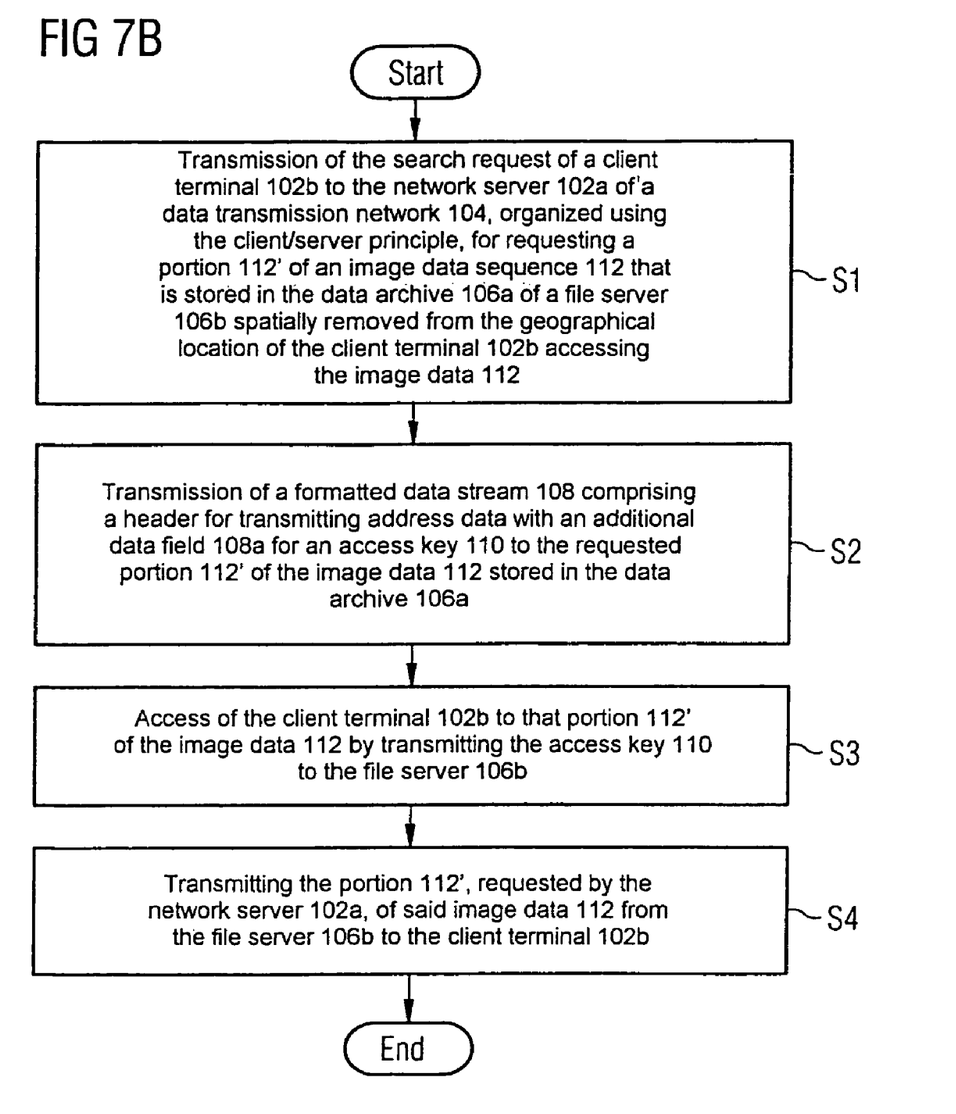
Figure 7C:
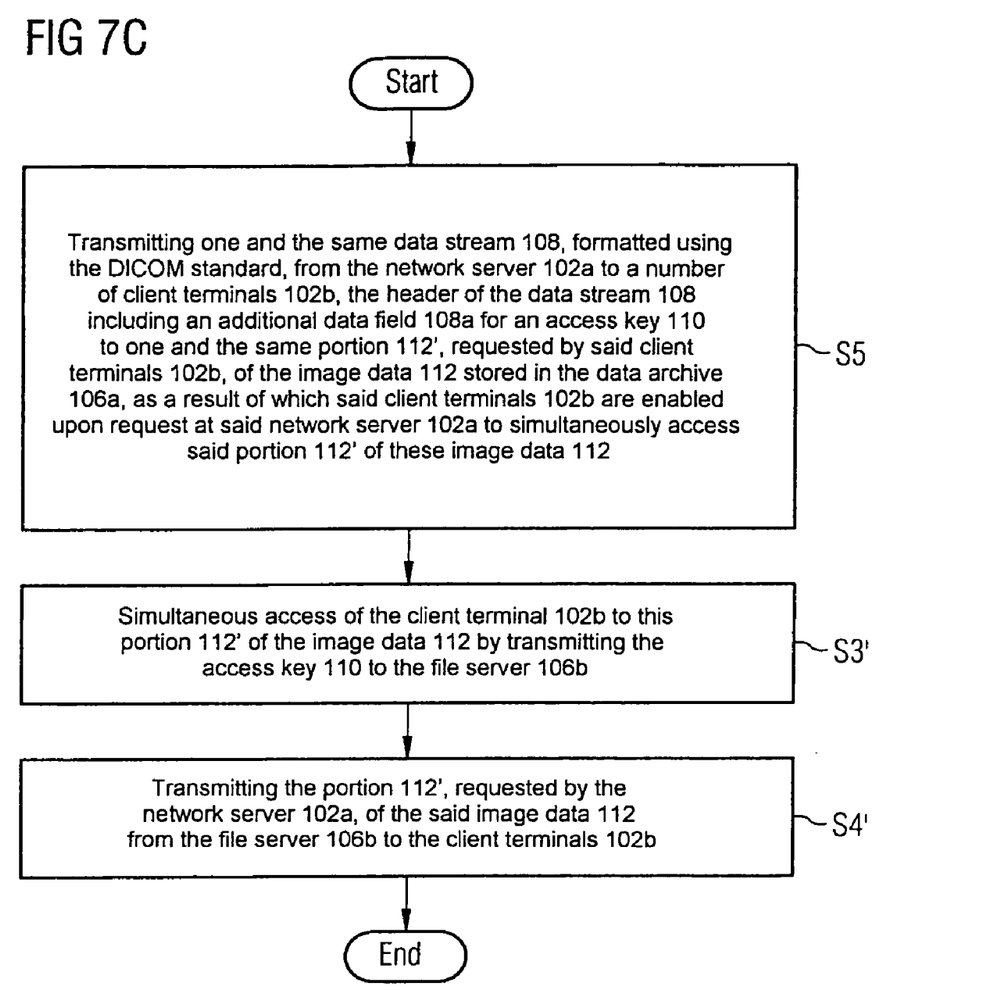

The individual steps in the storage and access method according to an embodiment of the invention are illustrated in the flowcharts depicted in FIGS. 7a-c.

In the case of the method sketched in FIG. 7a after transmission (S0) of an access key 110, received from the network server 102a, to a spatially removed file server 106b, a client terminal 102b can optionally access a portion 112', requested by the client terminal 102b from the network server 102a, of the image data 112 stored in a data archive 106a of said file server 106b, with the aid of the address information included in the access key.

The details of this method are reproduced by the flowchart depicted in FIG. 7b. The method starts by transmitting (S1) a search request of a client terminal 102b to the network server 102a of the data transmission network 104, organized using the client/server principle, for requesting a portion 112' of an image data sequence 112 that is stored in the data archive 106a of a file server 106b that is spatially remote—with reference to the geographic location of the client terminal 102b accessing the image data 112. Subsequent thereto, the network server 102a transmits (S2) to the client terminal 102b a formatted data stream 108 including a header for transmitting address data with an additional data field 108a for an access key 110 to the requested portion 112' of the image data 112 stored in the external data archive 106a. The client terminal 102b then accesses (S3) this portion 112' of the image data 112 by transmitting the access key 110 to the file server 106b, whereupon the file server 106b transmits (S4) the portion 112', requested by the network server 102a, of said image data 112 to the client terminal 102b.

According to a further exemplary embodiment of the present invention, as illustrated in FIG. 7c, one and the same data stream 108 formatted using the DICOM standard is transmitted (S5) from the network server 102a to a multiplicity of client terminals 102b. The header of the data stream 108 in this case includes an additional data field 108a for an access key 110 to one and the same portion 112', requested by the client terminals 102b, of the image data 112 stored in the data archive 106a. In this way, after request on the part of said network server 102a, said client terminals 102b are enabled to simultaneously access the portion 112', requested by them, of these image data 112.

By contrast with the image retrieval method described in US 2003/0005464 A1, in which a code (Random Unique Identifier, RUID) including a pseudo random number and character string is used to encrypt and decrypt a complete image data sequence, and thus as access code, this access code being stored, however, in a fashion spatially separate from the image data sequence stored in a central data archive, in accordance with an embodiment of the present invention, the image retrieval system 100 does not require a specially generated access code to access the in the data archive 106a of the file management system 106 spatially separated from the server 102a and client 102b. Instead of this, according to an embodiment of the invention a DICOM UID is used, for example, as link for indirectly addressing the image data sequence stored in the data archive 106a.

A further difference from the client/server system disclosed in US 2003/0005464 A1 resides in that, in accordance with an embodiment of the present invention, the image retrieval system 100 does not require a separate database for storing meta information, from which the assignment of the memory addresses to the individual frames F1 to FN stored in the data archive 106a of the external file management system 106 can be taken. This assignment takes place according to an embodiment of the invention via the access key 110 (the DICOM UID) included in an additional data field 108a in the header of the modified DICOM data stream 108. A client terminal 102b of a hospital information system (HIS), a terminal connected to the radiology information system (RIS) of the respective hospital, and any other terminal that receives the access key 110 via the DICOM data stream 108 modified according to the invention can use these meta data to determine the memory address of the requested image data 112' (for example the frames F1 to F8 of the image data sequence 112) if it knows the private DICOM attributes required to receive the data stream 108, and is thus authorized to receive the the DICOM data stream 108.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An access method for an image retrieval system in a data transmission network organized using the client/server principle, for enabling access to image data that are stored in a data archive of a file server that is spatially remote with reference to the geographical location of a client terminal accessing the image data, comprising:
   transmitting a search request of the client terminal to a network server in order to request a portion of an image data sequence stored in the data archive;
   modifying and transmitting a formatted data stream from the network server to the client terminal, the modified data stream including a header carrying only metadata relating to individual frames of an image data sequence sent via the data transmission network and an additional data field for an access key embedded in the header as additional meta information, the access key being to bulk data relating to individual frames of the image data stored in the data archive;
   transmitting to the file server a component of the image data that includes an access key to access at least a portion of the image data that is requested by the client terminal from a network server, wherein
   the access key is transmitted from the network server to the client terminal, for indirectly addressing the at least a portion of the image data, and
   the network server does not transmit the image data over the transmission network.

2. The access method as claimed in claim 1, wherein the transmitting includes:
   accessing the client terminal to the at least a portion of the image data by transmitting the access key to the file server; and
   transmitting the at least a portion, requested by the network server, of the image data from the file server to the client terminal without transmitting all frames of an image data sequence to the client terminal.

3. The access method as claimed in claim 1, wherein the access key is a pointer to a section of the image data of a file that contains the image data in plain form.

4. The access method as claimed in claim 2, wherein the data stream transmitted from the network server to the client terminal is a data stream formatted using the Digital Imaging and Communication (DICOM) standard that includes only the header for transmitting address information with the additional data field for the access key to the portion, requested by the client terminal, of the image data stored in the data archive.

5. The access method as claimed in claim 2, wherein the transmission is of the same formatted data stream from the network server to a number of client terminals, the header of this data stream including an additional data field for the access key to one and the same portion, requested by the client terminal, of the image data stored in the data archive, as a result of which the client terminals are enabled, after a request on the network server, to access the portion of these image data at the same time.

6. An image retrieval system in a data transmission network organized using the client/server principle, for enabling access to image data that are stored in a data archive of a file server that is spatially remote with reference to the geographical location of a client terminal accessing the image data, comprising:
   a network server for modifying and transmitting a formatted data stream to the client terminal upon request of at least a portion of the image data from the network server by the client terminal, wherein the modified data stream includes a component of the image data having a header carrying only metadata relating to individual frames of an image data sequence sent via the data transmission network, and an additional data field an access key for an access key embedded in the header as additional meta information, the access key being to bulk data relating to individual frames of the image data stored in the data archive, wherein
   the access key is transmitted from the network server to the client terminal, for indirectly addressing the at least a portion of the image data, and
   the network server does not transmit the image data over the transmission network.

7. The image retrieval system as claimed in claim 6, wherein the access key is a pointer to a section of the image data of a file that contains the image data in plain form.

8. The image retrieval system as claimed in claim 6, wherein the data stream transmitted from the network server to the client terminal is a data stream formatted using the Digital Imaging and Communication (DICOM) standard that includes only the header for transmitting address information with the additional data field for the access key to the portion, requested by the client terminal, of the image data stored in the data archive.

9. The access method as claimed in claim 2, wherein the access key is a pointer to a section of the image data of a file that contains the image data in plain form.

10. The access method as claimed in claim 3, wherein the data stream transmitted from the network server to the client terminal is a data stream formatted using the Digital Imaging and Communication (DICOM) standard that includes only the header for transmitting address information with the additional data field for the access key to the portion, requested by the client terminal, of the image data stored in the data archive.

11. The access method as claimed in claim 3, wherein the transmission is of the same formatted data stream from the network server to a number of client terminals, the header of this data stream including the additional data field for the access key to one and the same portion, requested by the client terminal, of the image data stored in the data archive, as a result of which the client terminals are enabled, after a request on the network server, to access the portion of these image data at the same time.

12. The access method as claimed in claim 4, wherein the transmission is of the same formatted data stream from the network server to a number of client terminals, the header of this data stream including the additional data field for the access key to one and the same portion, requested by the client terminal, of the image data stored in the data archive, as a result of which the client terminals are enabled, after a request on the network server, to access the portion of these image data at the same time.

13. The image retrieval system as claimed in claim 7, wherein the data stream transmitted from the network server to the client terminal is a data stream formatted using the Digital Imaging and Communication (DICOM) standard that includes only the header for transmitting address information with the additional data field for the access key to the portion, requested by the client terminal, of the image data stored in the data archive.

14. An access method for an image retrieval system in a data transmission network organized using the client/server principle, for enabling access to image data that are stored in a data archive of a file server that is spatially remote with reference to the geographical location of a client terminal accessing the image data, comprising:

modifying and transmitting a formatted data stream to the client terminal upon request of at least a portion of the image data from the network server by the client terminal, wherein the modified data stream includes a component of the image data having a header carrying only metadata relating to individual frames of an image data sequence sent via the data transmission network and an additional data field for an access key embedded in the header as additional meta information, the access key being to bulk data relating to individual frames to the requested portion of the image data stored in the data archive, wherein the access key is transmitted from the network server to the client terminal, for indirectly addressing the at least a portion of the image data, and the network server does not transmit the image data over the transmission network.

15. The access method as claimed in claim 14, wherein the access key is a pointer to a section of the image data of a file that contains the image data in plain form.

16. The access method as claimed in claim 1, further comprising:

splitting the image data of the formatted data stream into a component to be transmitted by the network server to the client terminal and a component not to be transmitted by the network server.

17. The access method as claimed in claim 14, further comprising:

splitting the image data of the formatted data stream into a component to be transmitted by the network server to the client terminal and a component not to be transmitted by the network server.

18. The image retrieval system as claimed in claim 6, wherein the formatted data stream is a Digital Imaging and Communication (DICOM) split into multiple files without information loss.

* * * * *